Aug. 25, 1931.   N. TRBOJEVICH   1,820,409
METHOD OF CUTTING GEARS AND APPARATUS THEREFOR
Filed Jan. 14, 1927   4 Sheets-Sheet 1
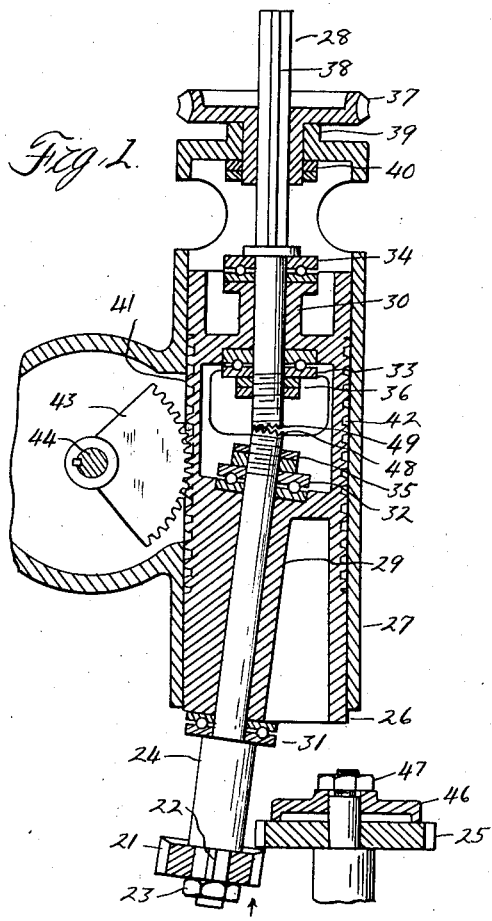
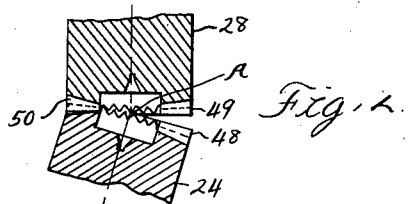
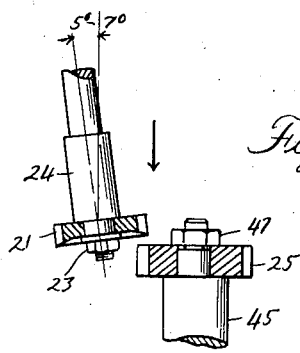
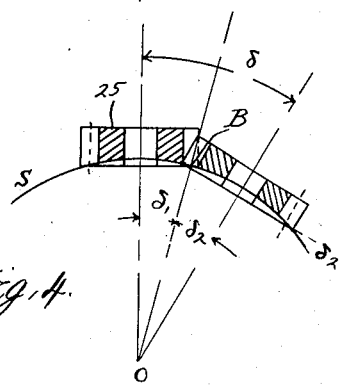
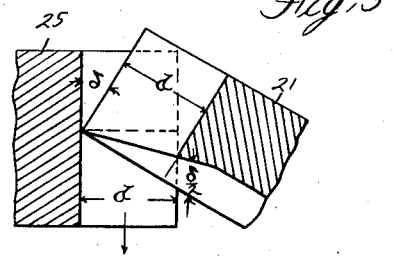
Inventor
Nikola Trbojevich
By Whittemore Hulbert, Whittemore and Belknap
Attorneys Aug. 25, 1931.  N. TRBOJEVICH  1,820,409
METHOD OF CUTTING GEARS AND APPARATUS THEREFOR
Filed Jan. 14, 1927  4 Sheets-Sheet 2

Inventor
Nikola Trbojevich
By Whittemore, Hulbert
Whittemore and Belknap
Attorneys

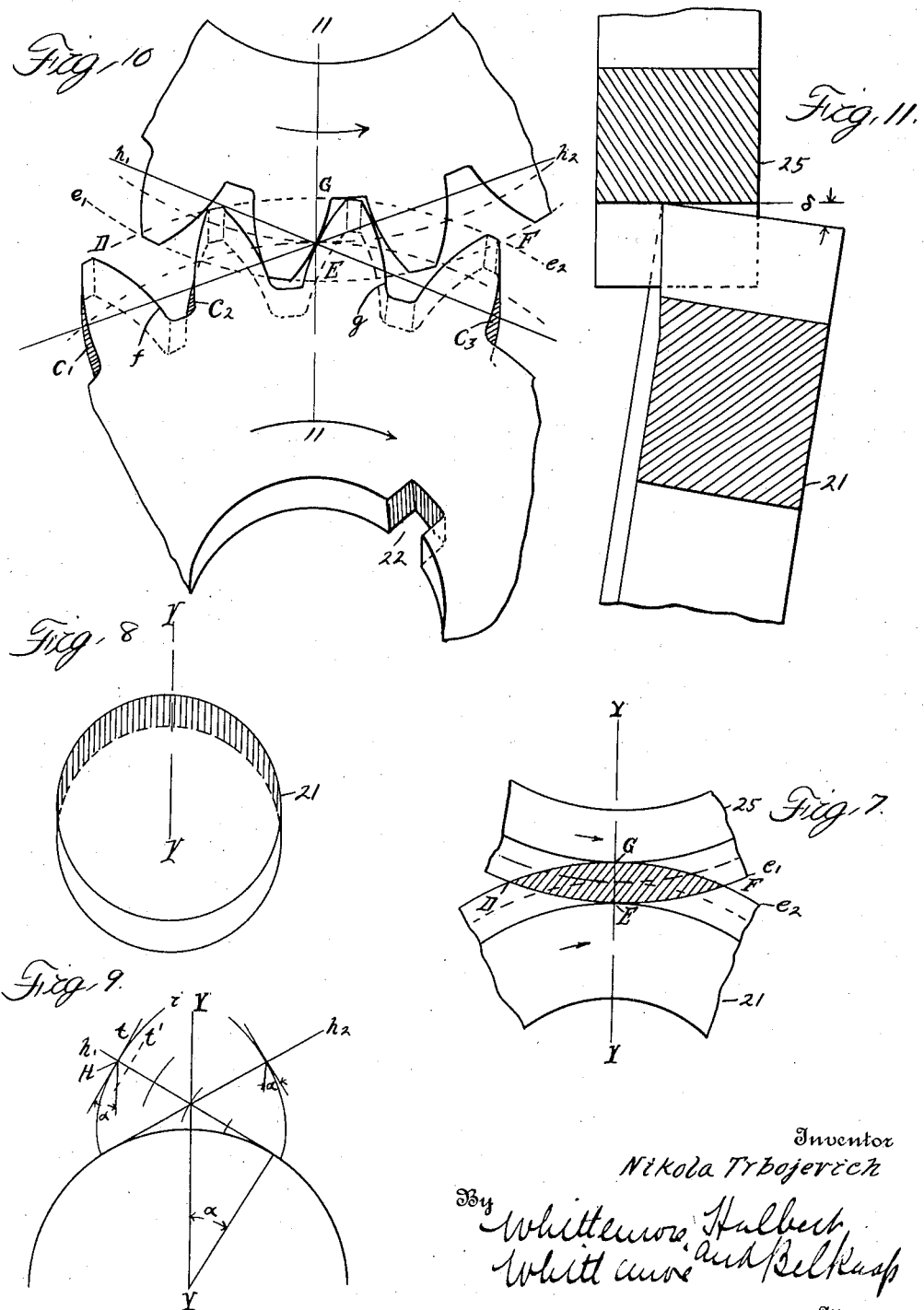

Aug. 25, 1931.  N. TRBOJEVICH  1,820,409
METHOD OF CUTTING GEARS AND APPARATUS THEREFOR
Filed Jan. 14, 1927  4 Sheets-Sheet 4
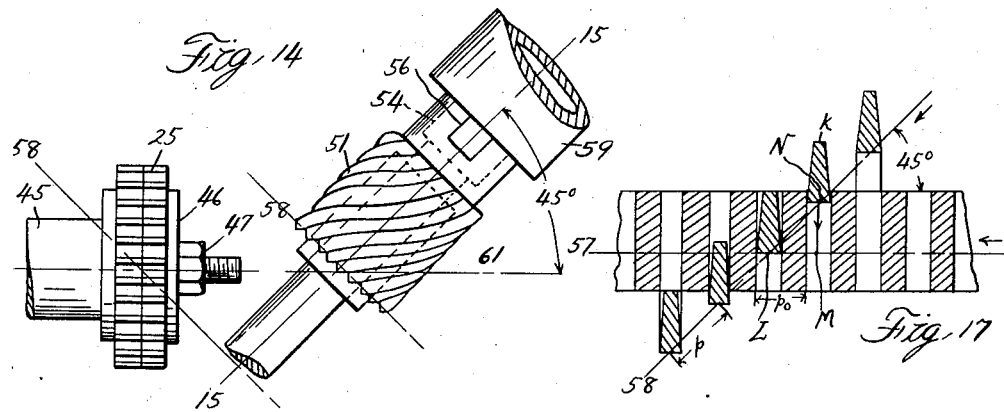
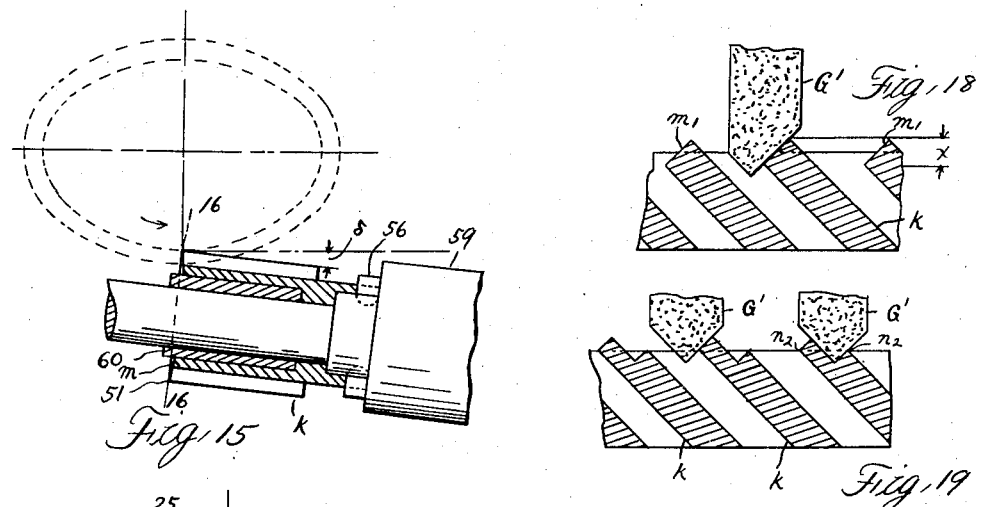
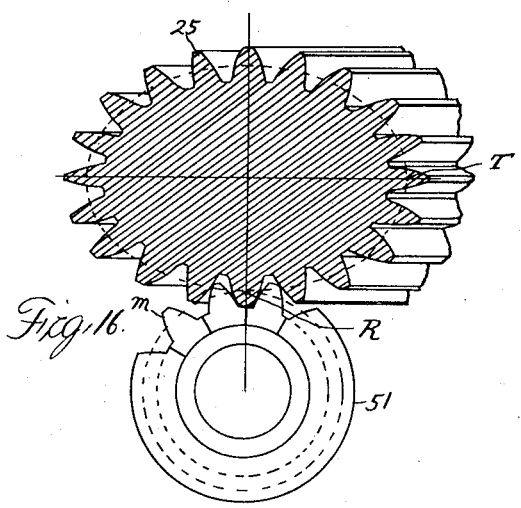
Inventor
Nikola Trbojevich
By Whittemore Hulbert
Whittemore Belknap
Attorneys Patented Aug. 25, 1931

1,820,409

UNITED STATES PATENT OFFICE

NIKOLA TRBOJEVICH, OF HIGHLAND PARK, MICHIGAN

METHOD OF CUTTING GEARS AND APPARATUS THEREFOR

Application filed January 14, 1927. Serial No. 161,162.

The invention relates to an improvement in gear generating which is applicable to the shaping or hobbing of spur gears having teeth which are longitudinally either straight, helical or worm, and which are in cross section either of involute or some other contour. My invention particularly refers to the generating of gears by means of a modified form of cutter of the so-called "pinion" or "Fellows" type. The improvement consists in the fact that the new cutters are manufactured without any cutting clearance or relief to the cutting teeth, that is, cylindrical. However, they will cut freely and without dragging over the metal due to the improved method of generating whether it be in a gear shaper or in a hobbing machine. I also discovered a way of modifying the tooth forms of these new cutters in such a fashion as to allow for the peculiarities of the new generating method with the result that theoretically correct gears may be produced thereby.

The objects of the invention are: First, to simplify and cheapen the manufacture of cutters; second, to improve their cutting action; third, to devise a line of cutters that will not change their diameter or tooth form after any number of sharpenings and thus to insure a constant uniformity of produced gears; and, fourth, to make such cutters of a wide face so as to make them strong and capable of withstanding a greater number of sharpenings.

In the drawings:

Figure 1 is a cross section of the cutter head of the improved gear shaper operating on the "pull" stroke;

Figure 2 is a detail sectional view of the bevel toothed joint connecting the upper and the lower portions of the cutter spindle shown in Fig. 1;

Figure 3 is a view of the arrangement of the cutter relative to the blank when operating on the "push" stroke;

Figure 13:
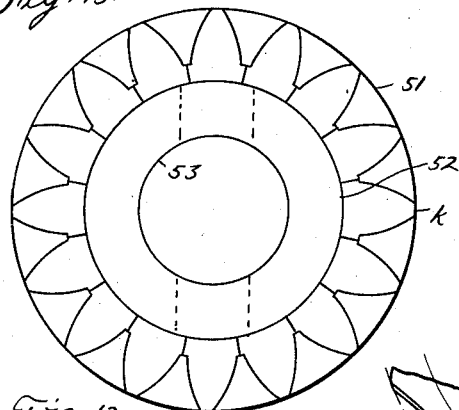
Figure 12:
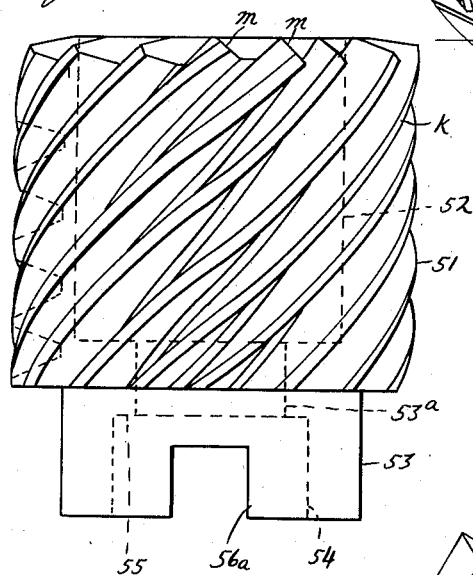
Figure 6:
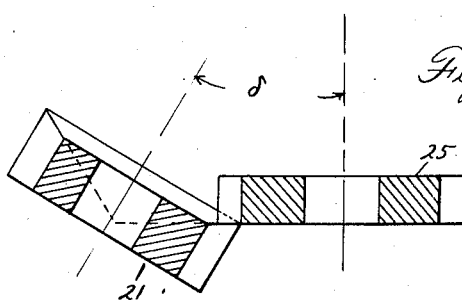

Figures 4 to 9 inclusive are diagrams explanatory of the theory of the process, Figures 4 to 6 showing different methods of forming the cutting (top) surfaces of the cutter and Figures 7 to 9 showing the principle upon which the cutting clearance is obtained;

Figure 10 is an enlarged plan view of the cutter and blank shown in Figure 1 and shows the distribution of cutting clearances when an 18 tooth gear is generated by means of an 18 tooth cutter;

Figure 11 is a section on line 11—11 of Fig. 10;

Figures 12 and 13 are respectively a plan and end view of the improved hob for generating spur gears;

Figure 14 is a plan view of a portion of a hobbing machine showing the angular relation of the work and the hob of Fig. 12;

Figure 15 is a section through the axis of the hob spindle taken on line 15—15 of Fig. 14;

Figure 16 is a diagrammatic view of the cutting face of the improved hob in engagement with the elliptic section of the blank taken through the line 16—16 of Fig. 15;

Figure 17 diagrammatically shows the superposition of the hob upon the gear by means of their plane developments;

Figures 18 and 19 show two methods of grinding the top surfaces of the improved cutters when they have helical teeth.

Figure 20:
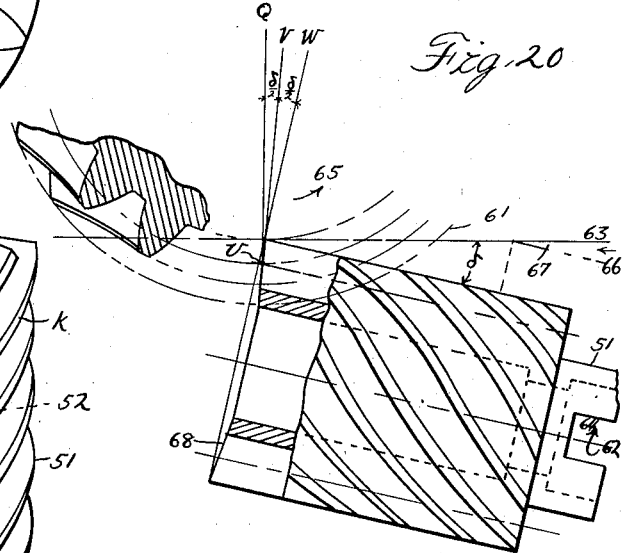

Figure 20 illustrates the new method of hobbing worm gears.

The new method of gear generating when applied to shaping of spur gears will best be understood from Fig. 1 which shows in cross section the cutter head of the new gear shaper. The cylindrical gear shaper cutter 21 is securely mounted by means of the key 22 and the nut 23 at the end of the lower cutter spindle 24. The object of this spindle is to rotate the cutter 21 in a timed relation with the blank 25 about its axis and also to reciprocate the cutter up and down in the vertical plane in order to produce shaping cuts. The reciprocatory motion is accomplished by the ram 26 which may move up and down, but cannot rotate, in the smoothly finished housing 27, thus carrying with it the lower cutter spindle 24 and the cutter and also the upper spindle 28. The ram 26 is provided with two accurately finished bores or bearings, both in the vertical plane, the lower bearing 29 accommodating the lower spindle 24 at an angle of inclination relative to the axis of gear blank 25 depending upon the desired amount of cutting clearance, usually from 5 to 7 degrees and the upper bearing 30 for the spindle 28, the latter being parallel to the axis of blank. The two spindles 24 and 28 are fixed in their position relative to the ram 26 by means of ball thrust bearings 31 and 32 for the lower spindle and 33 and 34 for the upper spindle. The double nuts 35 and 36 serve to hold said thrust bearings in proper adjustment.

The upper spindle 28 engages the worm gear 37 with the sliding key 38, which permits it to transmit the rotation from said gear while reciprocating or when standing still. The gear 37 is rotatably mounted in the bearing 39 formed in the upper part of the housing 27 and is held in position by means of the thrust bearing 40. The ram 26 is provided with two racks 41 and 42 cut integrally in the sides of said ram 180° apart, the rack 41 being shown in engagement with the oscillating gear segment 43 when the shaper is operating on the "pull" stroke, that is, cutting upward. However, when it is desired to operate on the "push" stroke, the ram may be turned 180° and the rack 42 brought into engagement with said oscillating segment (see Fig. 3). The segment 43 is oscillated from the shaft 44 by a mechanism (not shown) similar to that in other shapers. The worm gear 37 and the work arbor 45 are rotated in a timed relation in order to produce the engagement of the cutter with the blank in the manner of two meshing spur gears. Inasmuch as this mechanism may be the same as that used in other machines of the same general type, it is not illustrated. After each cutting stroke it is well to rock the cutter housing a slight amount about the center of the shaft 44 by means of suitable cams in order to prevent the cutter from touching the blank upon its return or idle stroke. Such mechanisms are well known and are employed in all kinds of metal shapers, and therefore need not be illustrated. The blank 25 is held to the work arbor 45 by means of a clamping disk 46 and a nut 47.

In order to transmit the rotation from the upper spindle 28 to the lower spindle 24 they are formed at the point of their contact into two small bevel gears 48 and 49, shown in detail in Fig. 2. It is essential that the teeth 50 be formed according to the correct conical principle (all meeting at the common apex A where the two axes intersect) in order that the rotation may be transmitted uniformly and without backlash.

From the foregoing description the principle of operation will now be explained. The cutter reciprocates in plane tangent to the gear blank and parallel to the axis of said blank and also rotates about its own axis at an angle to the plane of reciprocation. This will cause the cutting or the top surface of the cutter to perform a conical planetary motion relative to the blank and the only portion of the cutter that will touch the blank at all is its end or cutting face. This naturally provides a cutting clearance for the rest of the cutter which is cylindrical. This is further illustrated in Fig. 4, showing that the new method of generating is based upon a theoretically correct principle. The axes of the gear 25 and the cutter 21 intersect at the point O at an angle $\delta$. Now draw a sphere using O as a center, said sphere to pass through the point B where the pitch line of the cutter touches the pitch line of the gear. In this manner two concentric cones are formed having cone angles $\delta_1$ and $\delta_2$ and those two cones will roll one upon the other without sliding when the gear and the blank are rotated in the proper timed relation. It is now evident that no matter what the tooth curves of the gear 25 are, providing they are all alike and equally spaced. they also will be all alike and equally spaced on the surface of the spherical lamina formed by the intersection of the gear with the sphere S. Thus it is necessary; first, to determine the spherical section or lamina of the gear; second, to find the conjugate spherical curves for the cutter from the known curves of the gear; third, to construct a cylindrical cutter by drawing a series of cylinders containing said spherical curves and parallel to the axis of the cutter, and; fourth, to grind the cutting face of the cutter in form of a sphere having its center at O. Such a cutter when used in the manner shown in Fig. 1 will produce gears without any error whatever (theoretically), and will have the unprecedented advantage that it will never change its size or form through repeated sharpening. Regarding the last mentioned point, it is readily seen that no matter how many times the cutter should be ground it will always maintain its form because it is cylindrical. Similarly the cutter may be reciprocated freely parallel to the axis of the blank without changing the conditions of generating in the slightest, because the center of the "pitch" sphere S will also reciprocate in unison along the axis of the gear. However, the cutter will be correct only for a gear having the number of teeth for which it was made, but this limitation is not serious in mass production of similar gears.

While theoretically it would be necessary to grind the cutting face of the cutter to a hollow spherical shape, it is not necessary to do so in practice, and I prefer to grind those faces in form of hollow cones and allow for the error thus incurred by slightly changing the form of the cutter empirically. The errors are very slight anyway, because, for instance, if no spherical or other correction were used at all the error at 7 degrees clearance angle would be less than ¾ of one per cent, since the cosine of 7 degrees is .99255.

Figures 5 and 6 show two such methods of hollow-cone sharpening, each of which has certain advantages. In Fig. 5 the clearance angle is split in two halves and the cutter is ground with the rake equal to one half of the clearance angle. The result may be seen by studying that figure; the depth of the tooth $d$ is the same for the gear and the cutter. In Figure 6 the rake of the cutter is equal to the clearance angle, resulting in a more favorable cutting action and in a somewhat simplified method of calculating the corrections because the side of the cutting cone is perpendicular to the axis of the gear, although the teeth of the cutter are now shallower in normal section than those of the gear.

Figures 10 and 11 are two enlarged views of the cutter and blank shown in Fig. 1 and are drawn to scale to show the distribution of cutting clearances when an 18-tooth cutter meshes with a similar gear. Attention is called to the cross-sectioned spots $C1$, $C2$ and $C3$, at which points the cutter would rub against the gear if it engaged the gear at those spots. However, that is impossible as the possibility of contact is confined to the lens-shaped area $D\,E\,F\,G$ (see also Fig. 7) formed by the outside circle of the gear $e1$ and that of the cutter $e2$, which area does not include said spots $C1$, $C2$, etc. Those "rubbing spots" are not parts of the cutting teeth, but they are fixed in space and when, for instance, the cutting tooth $f$, Fig. 10, which is shown at the left side of the drawings, moves toward the center of engagement, it loses those spots and will have a cutting clearance all over similar to the tooth $g$.

In this system of gear cutting the cutting clearances along the outside diameter of the cutter are distributed over a crescent-shaped area as shown in Figure 8, while the area in which clearance is actually needed is a lens-shaped area (Fig. 7). The lens-shaped area, when superposed over the cerscent, only absorbs the middle portion of said crescent, and in particular, that portion in which the clearances are the greatest.

The area of possible contact of the cutter with the blank is still further restricted in the case when finish cutting involute gears. As is shown in Figure 9, the points of momentary contact always lie in that case on the immovable lines of action $h^1$ and $h^2$, a well known rule of involute gearing. Thus the tangent $t$ to the involute $i$ at the point H will always have the same cutting clearance, depending upon the pressure angle $\alpha$, no matter how near or far it is from the axis $Y$—$Y$. This is a rather important point in favor of this system because the uniform cutting clearance results in a better cutting action and also permits use of cutters having a comparatively small number of teeth, that is, having undercut flanks.

Helical gears, spline shafts, ratchets, saws, etc. may also be shaped according to this method. For shaping helical gears the cutter also should be helical, but of the opposite hand, and should receive an additional rotation to and from while reciprocating, as it will be understood by all those familiar with the present gear manufacturing processes.

*Application to gear hobbing*

The application of this principle to gear hobbing leads to a radically new hobbing process and also to a novel hobbing machine. Whereas the present hobs are of the worm type having longitudinal gashes and relieved cutting teeth, the new hobs are of the end-mill type, have no gashes and the cutting teeth are not relieved. The main object of this improvement is to reduce the tool cost and to provide hobs with long and strong teeth that will withstand heavy cuts. The unchangeable diameter and helical angle of the hob is also a point to consider because it leads to a simplification of the hobbing machine.

Two views of the new hob are shown in Figs. 12 and 13. It is seen that the hob represented therein resembles an end mill having helical flutes. The teeth $k$ have an either right-hand or left-hand twist to give a helix angle of preferably 45 degrees for cutting spur gears having straight teeth. To cut helical or worm gears the helical angle should be determined with regard to the angle and hand of helix which it is desired to generate.

The teeth $k$ (which are all alike and are equally spaced) are ground on their ends $m$ whenever they get dull. The grinding operation must be accurately performed and always in the same form or style because the accuracy of spacing of teeth in the gears cut and their tooth form in this system depend upon correct sharpening to a much greater extent than they do in the case of common hobs. There are two methods of sharpening such cutters, shown respectively in Figs. 18 and 19, both of which illustrate diagrammatically the pitch plane development of the cutter. According to the simpler method shown in Fig. 18 the cutting faces $m1$ are preferably at right angles to the tooth helixes $k$ and also have a slope or hook extending toward the center of the hob as is indicated in Fig. 15. The disadvantage of this method is that the cutting edges on the opposite sides of a tooth will not lie in the same plane or cutting circle, thus requiring a special correction of tooth form on each side on this account. This difficulty is obviated by the method shown in Fig. 19 in which the opposite cutting edges $n^1$ and $n^2$ of the tooth $k$ are in the same plane or cutting circle. The tool for performing the grinding operations is represented at G'.

The hob shown in Figs. 12 and 13 is of the hollow shell type and its toothed portion 51 is provided with a bore 52 of comparatively large diameter in order that during each sharpening not too much stock need to be ground off. The entire toothed portion 51 is intended for useful production of gears and this tool will last until the cutting faces $m$ through repeated sharpenings come down to be about in line with the bottom of the large bore 52. It is readily seen that by the virtue of this improvement the tool cost is materially reduced as the life of the hob is several times longer than that of a common hob of a similar length and diameter.

The hob is provided with a shank 53 having a bore $53^a$ extending therethrough and a larger counterbore 54 for receiving the hob arbor 59. The end of the arbor engages the annular shoulders 55, thus taking up the thrust and a suitable key 56 may be provided engageable in the keyway $56^a$ for securing the hob to the arbor.

Figure 14 shows diagrammatically the plan view of a portion of a hobbing machine in which the new hobs are used. Two gear blanks 25 are mounted upon the work arbor 45 and are firmly held there in position by means of the clamp 46 and nut 47. The helical hob 51 is right hand, 45 degrees helix angle, and possesses the same normal pitch as the gear to be cut. The theory of engagement may best be studied from the plane developments of the pitch cylinders of the gear and hob shown in Figure 17. Inasmuch as the normal pitch $p_0$ is the same for both members it follows that the circumferential pitch of the hob is $$p = p_0 \sqrt{2}.$$

When the gear and the hob are rotated in the required timed relation, the circumferential velocity of the gear $v_0$ along the pitch line 57 should be equal to the component of the hob velocity $v$ in the same line 57. From this it follows that if during a unit of time the gear tooth has covered the distance from M to L in the line 57, the corresponding hob tooth $k$ will cover the distance N L in the line 58. This last velocity is resolved into two components N M and M L respectively, the first component giving numerically the amount of sliding of the hob teeth over the gear teeth while the second component gives the amount of rolling during the same time. For the selected helix angle of 45 degrees both of these components are equal with each other and also are equal to the hob velocity multiplied by .707 (cosine of 45°). The interesting practical consequence of this is that in this system to accomplish a cutting velocity of, say, 100 ft. per min., the hob should be run at 141 ft. per min. and the gear blank at 100 ft. per min.

Referring now to Figures 14 and 15, the hob 51 is keyed to the hob arbor 58 by means of the key 56. A bushing 60 fits over the hob arbor with its inner diameter and into the large bore 52 of the hob with its outer diameter. By tightening said bushing 60 by means of collar and a nut at the end of the arbor 59 in the customary manner, the hob may be firmly held in its position upon the hob arbor.

The novelty of this hobbing machine consists in the new relative arrangement of the hob and gear arbors. The hob arbor includes an angle of 45 degrees with the gear arbor in the horizontal plane, Fig. 14, and an angle ranging from 5 to 12 degrees (depending upon the amount of cutting clearance required) with said horizontal plane, Fig. 15, in the vertical plane passing through the axis of hob arbor. During the timed rotation of the gear and hob the hob is bodily translated in the plane parallel to the axis of the gear as in all other hobbing machines.

Figure 16 shows the method according to which the correct contours of the hob teeth may be determined. Fig. 16 was obtained from Fig. 14 by first superposing the blank 25 over the hob and by taking a section through the plane 58 in which the hob teeth are cutting. In this section (at 45 degrees with respect to the gear axis) the cross section of the gear becomes an elliptic lamina of a variable pitch and depth of tooth. In particular, at the point R (at the end of the minor axis), the depth of tooth is at the minimum and the pitch at maximum, thus giving the maximum angle of pressure. At the point T the conditions are completely reversed. In spite of this irregularity, the elliptic lamina is capable of correct meshing with a rack element of constant pitch. This can be readily proved without any complicated calculation from the fact that any plane section of a rack is a rack element of constant pitch. On the other hand, a rack is capable of meshing with a spur gear over its entire face, that is, with all plane sections of said gear. Therefore, a plane section of the gear (the elliptic lamina) will mesh with the corresponding plane section of the rack.

The meshing of the elliptic lamina with the rack element of constant pitch must be taken, however, only in the strictest mathematical sense. Thus it must be assumed that during said meshing the ellipse 62 in Fig. 16 is standing still while the teeth of the lamina circulate through the indicated channels and continuously change their velocity, pitch, depth and pressure angle. This happens in practice only in a projective sense. Nevertheless the fact remains that if we construct the hob teeth in such a manner that they will mesh with that certain imaginary rack element, they will also mesh with the lamina and thus generate a spur gear.

Upon a mathematical analysis which is too complicated to be given here, I have found a slight discrepancy in the manner in which the ellipse meshes with the rack on one hand, and the rack with the hob teeth on the other hand. There is a slight time element involved resulting in the curious fact that although both the ellipse and the hob are capable of fully generating the same rack element, yet when they are placed together they will meet the rack in a given instant at two different sets of points. An allowance can be made for this by correcting the hob teeth on both sides.

My improved gear generating method is also applicable to the hobbing of helical and worm gearing. When hobbing worm gears only the tangential feed method should be employed, because the hob has so few teeth. In Figure 20 this new method of worm gear hobbing is shown. The hob 51 is built along the same plan as the hob shown in Fig. 12. The pitch diameter, lead, helix angle and tooth form of the hob 51 must agree with the corresponding dimensions of the worm which is going to mesh with the blank 61. The hob axis 62 lies in the central plane of the blank 61 and includes a clearance angle $\delta$ with the line of feed 63. Both the hob and the blank are rotated in a timed relation and in the direction of the arrows 64 and 65, while the hob is being simultaneously also translated along the feed line 63 in the direction of the arrow 66. The tops of hob teeth are ground according to the method diagrammatically shown in Fig. 19. The process of generation is automatic and continuous. In its initial position the hob is in the place indicated by two dotted lines 67 and by the time the front or cutting end of the hob has passed across the gear and at the other side of the same, the gear will be completely finished.

The method of compensating for the changes of tooth form due to the clearance angle $\delta$ is also new. If the hob teeth on their cutting tops be provided with a rake 68 (also the line U V) forming an angle $$\frac{\delta}{2}$$

equal to one half of the clearance angle with the plane U W normal to the hob axis 62, it will be evident that the depth of tooth and the radii of curvature will be distorted in proportion to cosine of $$\frac{\delta}{2}$$

and the operating section of the hob will be part of an ellipse. However, that elliptic section of the hob will mesh with the corresponding elliptic section U V now taken through the gear 61. It is to be noted that both coinciding sections U V are distorted to the same measure from their true forms QU and U W respectively, from which it follows that they will remain conjugate to the same extent and QU and UW are to each other. In this manner the error due to clearance angle may be minimized.

What I claim as my invention is:

1. A generating cutter for cutting gears comprising a cylindrical body having a plurality of longitudinally arranged teeth thereon to extend along the surface of a cylinder, said teeth being of constant cross section throughout the length thereof and being conically conjugate to the teeth of the gear to be generated in such a manner that said teeth cut without rubbing when said cutter is offset relative to the gear, said teeth also having a series of similar and similarly arranged cutting edges, all lying in a circle perpendicular to the axis of the cutter.

2. A generating cutter for gears comprising a cylindrical body, a plurality of peripherally spaced teeth on said body extending longitudinally thereof and along the surface of a cylinder, each tooth being of a cross sectional contour conically conjugate to the tooth form of the gear to be generated in such a manner that said teeth cut without rubbing when said cutter is offset with respect to the gear and being of constant cross section throughout its length, the end of said body being of hollow conical shape forming an inclined cutting face on each tooth.

3. The method of hobbing gears which consists in selecting a hob having a series of circumferentially spaced teeth extending longitudinally thereof, each tooth being of uniform cross section throughout its length and having a cutting face at one end thereof, supporting said hob with its axis inclined to a tangent plane of said gear blank to obtain cutting clearance, rotating said gear blank and said hob about their respective axes in timed relation and advancing said hob into said blank in a direction parallel to said tangent plane and inclined with respect to the hob axis.

4. A generating cutter comprising a cylindrical body having teeth arranged thereon, each tooth being throughout its length of uniform cross section and equidistant from the axis of rotation, and each tooth terminating at one end in a cutting face of a modified contour which is conically conjugate to the tooth form of the gear blank, whereby said cutter may be mounted with its axis inclined to the axis of the gear blank to provide cutting clearance and when so mounted it will mesh with said gear blank in the fashion of two meshing bevel gears.

5. A generating cutter for cutting gears comprising a cylindrical body having a series of teeth circumferentially arranged thereon, each tooth extending longitudinally and equidistantly relative to the axis of rotation, each tooth being of a uniform and uninterrupted cross section throughout and terminating at one end in a cutting face, and having its tooth form so modified as to allow for a predetermined degree of cutting clearance when the axis of the cutter is inclined at an acute angle relative to the plane of feed.

6. A generating cutter for cutting gears comprising a cylindrical body having longitudinally arranged teeth thereon in such a fashion that all cross sections of the cutter perpendicular to the axis of rotation are uniform and of a modified tooth form to allow for a predetermined degree of cutting clearance, and all cutting faces are similar and similarly arranged in a circle perpendicular to said axis of rotation.

7. A generating cutter comprising a solid cylindrical worm of constant pitch and unvarying cross section and a modified tooth form, having its cutting faces arranged in a circle perpendicular to the axis of rotation at one end of said worm, the tooth form being so modified that the cutter will correctly mesh with the gear to be generated when the axis of the cutter is inclined relative to the plane of feed at a predetermined clearance angle.

8. A hob for cutting gears consisting of a cylindrical body and a plurality of helical teeth arranged thereon, said teeth being uninterrupted throughout their lengths and terminating at one end of the cutter in a plurality of cutting faces one for each tooth, said teeth having a cross section of modified tooth form such that the end of the hob comprising the cutting faces will correctly mesh with the blank and cut without rubbing when inclined at a predetermined clearance angle relative to the plane of feed and the hob may be resharpened indefinitely without losing its diameter helix angle and tooth form.

9. A method of gear cutting in which an imaginary truncated cone gear is first selected capable of meshing at its small end with the blank to be generated, and having a cone angle sufficient to provide a predetermined degree of cutting clearance, in which said conical lamina is copied upon the transverse section of a cylindrical cutter and said cutter is provided with cutting edges at one end thereof, in which the axis of the cutter is tilted relative to the plane of feed at the said clearance angle so that its cutting edges will engage the blank, in which the cutter is relatively translated parallel to the plane of feed and in which the cutter and the blank are rotated in unison to generate all teeth.

10. A method of gear hobbing which consists in selecting a helical cutter having solid uninterrupted teeth and cutting edges formed at one end thereof, in meshing the front or cutting end of said cutter with the teeth to be generated, in inclining the axis of the cutter relative to the feed plane to obtain cutting clearance at the front end of the cutter and inclining said axis relative to the axis of blank depending upon the helical angles of the cutter and blank, to obtain a rolling sliding engagement, in rotating both members in a timed rotation and in imparting a relative translation to the cutter in the plane of feed.

11. A method of gear hobbing in which a cylindrical cutter is selected having uninterrupted teeth throughout its length and cutting faces formed at one end thereof, and capable of meshing with its cutting end with the gear to be generated, in which the axis of the cutter is tilted with respect to feed plane to obtain cutting clearance and also tilted with respect to the axis of blank corresponding to the helical angles of the gear and hob, in which both members are rotated in a timed rotation and the hob is translated relative to the blank in the feed plane.

12. A hob for cutting gears comprising a solid worm and a plurality of cutting edges arranged in a circle in one end thereof, in which the cutting clearance is obtained by tilting the axis of the hob relative to the plane of feed at a predetermined clearance angle, in which the diameter helix angle and tooth form of the hob do not change through repeated sharpenings and in which the tooth form is modified on each side to correspond with an imaginary truncated conical screw that will correctly mesh with the gear to be cut in a plane which is perpendicular to the hob axis and forms an angle with the normal plane of the pitch cylinder of the gear equal to the said clearance angle.

13. A hob for cutting gears comprising a solid cylindrical worm and of unvarying cross section and a plurality of cutting edges formed at one end thereof, in which the helix of the hob threads is selected to permit a rolling sliding engagement with the teeth to be generated and the tooth form is modified to correspond exactly with a truncated conical screw that will correctly mesh with the gear to be generated in a plane perpendicular to the hob axis.

In testimony whereof I affix my signature.

NIKOLA TRBOJEVICH.